(12) United States Patent
Ogawa et al.

(10) Patent No.: US 6,742,806 B2
(45) Date of Patent: Jun. 1, 2004

(54) AIRBAG AND ITS WRAPPING METHOD

(75) Inventors: Hiroshi Ogawa, Aichi-ken (JP); Hiroshi Yasuda, Aichi-ken (JP); Shoji Okajima, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/014,443

(22) Filed: Dec. 14, 2001

(65) Prior Publication Data

US 2002/0089154 A1 Jul. 11, 2002

(30) Foreign Application Priority Data

Jan. 11, 2001 (JP) ........................................ 2001-004126

(51) Int. Cl.⁷ .................. B60R 21/20; B60R 21/22; B60R 21/16
(52) U.S. Cl. ...................................... 280/732; 780/743.2
(58) Field of Search ........................... 280/730.2, 743.1, 280/743.2

(56) References Cited

U.S. PATENT DOCUMENTS

| 5,464,246 A | * 11/1995 | Castro et al. | 280/730.2 |
| 5,628,527 A | * 5/1997 | Olson et al. | 280/730.2 |
| 5,794,971 A | * 8/1998 | Boydston et al. | 280/733 |
| 5,921,575 A | * 7/1999 | Kretschmer et al. | 280/728.2 |
| 5,938,233 A | * 8/1999 | Specht | 280/730.2 |
| 6,129,377 A | * 10/2000 | Okumura et al. | 280/730.2 |
| 6,145,879 A | 11/2000 | Lowe et al. | |
| 6,296,269 B1 | * 10/2001 | Nagai et al. | 280/728.2 |
| 6,334,627 B1 | * 1/2002 | Heym et al. | 280/743.2 |
| 6,390,502 B1 | * 5/2002 | Ryan et al. | 280/743.2 |
| 6,481,744 B2 | * 11/2002 | Melia | 280/730.2 |
| 6,520,533 B2 | * 2/2003 | Tanase et al. | 280/730.2 |
| 2002/0020995 A1 | * 2/2002 | Abe et al. | 280/743.1 |

FOREIGN PATENT DOCUMENTS

| DE | 297 12 437 U1 | 7/1997 |
| EP | 0 957 010 A2 | 11/1999 |
| JP | 11043004 | 2/1999 |
| JP | 11321532 | 11/1999 |

* cited by examiner

Primary Examiner—Ruth Ilan
(74) Attorney, Agent, or Firm—Posz & Bethards, PLC

(57) ABSTRACT

An airbag comprises an airbag body, and a wrapping member made tearable for preventing the airbag body from returning to its unfolded state. The airbag body is folded and housed on the peripheral edge of an opening on the inner side of a car body, and is folded up into a rod shape so that it may be inflated when an inflating gas flows thereinto so as to cover the opening. The wrapping member is made flexible and long and is wrapped on the outer periphery of the folded airbag body substantially all along the length of the same, so that it may extend obliquely to the axial direction of the airbag body folded up into the rod-like shape. Moreover, the airbag is restrained in its proper folded state substantially all along its length by a simple wrapping operation.

11 Claims, 16 Drawing Sheets

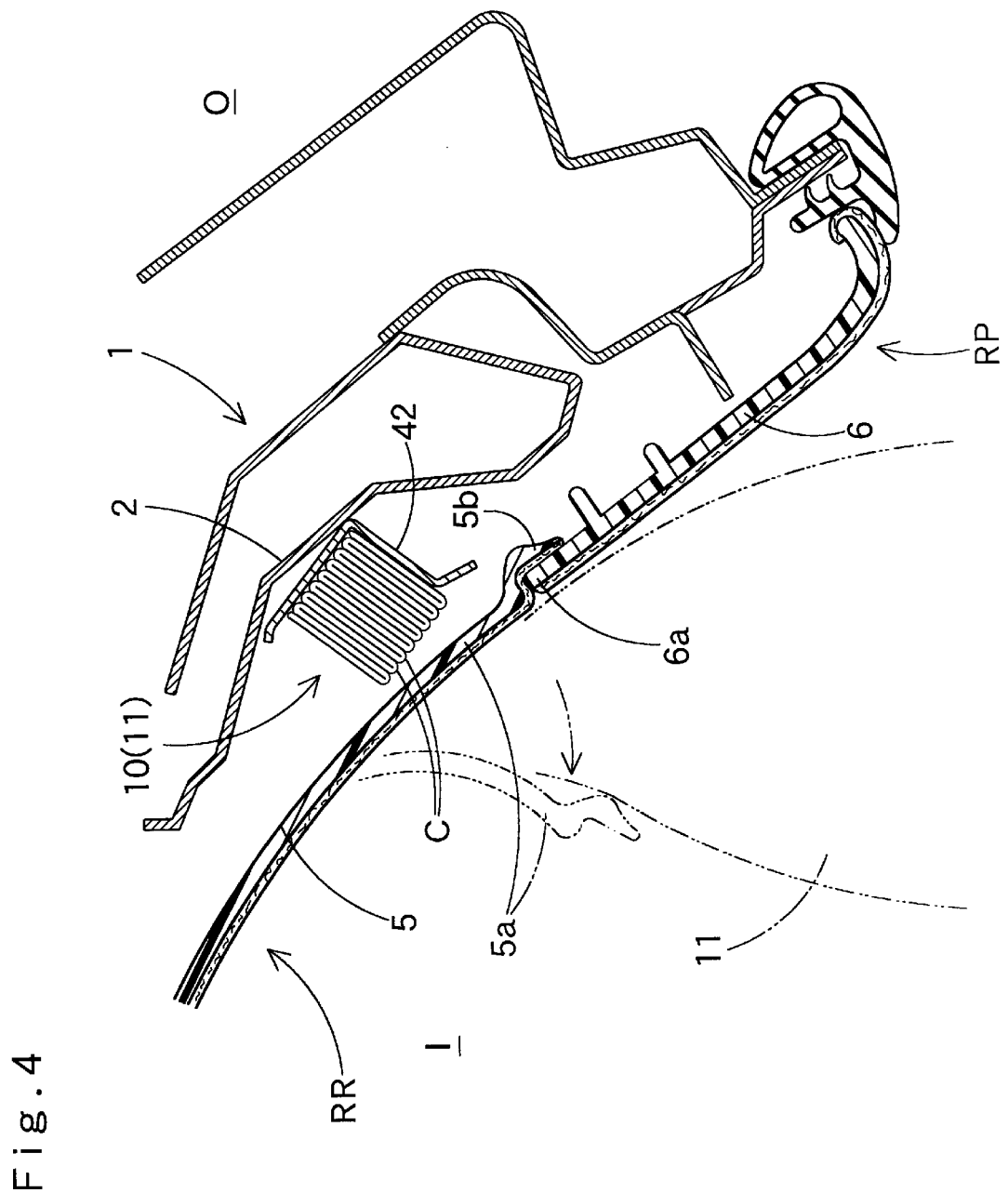

AIRBAG AND ITS WRAPPING METHOD

This application claims priority from Japanese patent application of Ogawa et al., filed on Jan. 11, 2001, No. 2001-4126, the complete disclosure of which is hereby incorporated into the present application by this reference.

BACKGROUND OF THE INVENTION

1. Field of the Invention

The present invention relates to an airbag used in a head protecting airbag device to be mounted on an automobile, and to its wrapping method. Specifically, the airbag of the present invention comprises an airbag itself and a wrapping material for keeping the airbag body in a folded state. This airbag body is folded and housed on the peripheral edge of an opening on the inner side of the car body and is extended/inflated when an inflating gas flows thereinto, so as to cover the inner side opening. The wrapping member prevents the folded airbag body from returning to its unfolded state. The wrapping member is wrapped around the airbag body when folded, and in this wrapped condition this airbag body is housed in the vehicle. This wrapping member is ruptured when the airbag body is inflated.

2. Description of the Related Art

In the airbag of the head protecting airbag device of this kind of the prior art, as disclosed in Unexamined Published Japanese Patent Application No. 32153/1999, a folded airbag body is wrapped by a wrapping member keeping the folds from shifting. This wrapping member is made of a tape member or the like. Without this wrapping member, the airbag body, after being folded up, returns to its unfolded state to expand in bulk because of the spring-back mechanism. Moreover, the airbag body loses its folded-up configuration so that it cannot be mounted in the vehicle.

However, the airbag body is folded up into a rod-like shape and the wrapping member of the prior art is wrapped around the airbag body perpendicularly to the air bag's axis. Moreover, a plurality of wrapping members is intermittently wrapped at several places along the axial direction of the folded airbag body.

In the airbag body of the prior art, specifically, the portions wrapped by the wrapping members and the portions not wrapped are alternate along the axial direction of the airbag body. It is, therefore, impossible to prevent the unwrapped portions of the airbag body from bulging due to the spring-back. As a result, there arises a problem that the airbag body cannot be mounted in the narrow housing portion provided in the vehicle.

Here, it is conceivable to wrap the airbag body with a bag (cylindrical) wrapping member so that the airbag body may be able to keep its folded-up state substantially all over its length. In this case, however, it takes a long time to insert the folded airbag body into the wrapping member having a small diameter. Alternatively, if the wrapping member has a sufficient internal diameter, it is necessary to reduce the diameter of the wrapping member itself after the folded airbag body is inserted into the wrapping member. This work has to be made on substantially all along the length of the airbag body and is troublesome.

SUMMARY OF THE INVENTION

The present invention has been conceived to solve the above-specified problems. Specifically, the present invention contemplates to provide an airbag which can remain in proper folded-up state substantially all along its length with a simple wrapping operation, and a wrapping method of the airbag.

According to the present invention, there is provided an airbag comprising: an airbag body; and a wrapping member made tearable for preventing the airbag body from being losing proper folded shape. The airbag body is folded and housed on the peripheral edge of an opening on the inner side of a car body, and folded up into a rod-like shape so that it may be extended/inflated when an inflating gas flows thereinto so as to cover the opening, and is then wrapped with the wrapping member. Moreover, the wrapping member is made of a flexible long material and is wrapped around the outer periphery of airbag body perpendicularly (obliquely) to the air bag's axis substantially all along its length.

In the airbag according to the present invention, the long wrapping member is not intermittently arranged along the axial direction of the airbag body folded into rod-like shape. Specifically, the wrapping member is wrapped on the outer periphery substantially all along the length of the folded airbag body obliquely to the air bag's axis. In this way, at least one portion of the wrapping member restrains the folded airbag body substantially all along the length of the airbag, and therefore the wrapping member restrains the outer periphery of the airbag body. As a result, the airbag body can be kept compactly folded up uniformly along the axial direction of the airbag body. Moreover, because the wrapping work is done helically along the outer periphery of the airbag body obliquely to the axial direction of the airbag body, it can be simply done.

In the airbag according to the present invention, therefore, the compactly folded-up state of the airbag body can be maintained uniformly substantially all over the airbag body by a simple wrapping operation.

Where the wrapping member includes a plurality of wrapping members, moreover, it is desired that the wrapping members are so wrapped on the outer periphery of the folded airbag body as to intersect with each other.

With this construction, the wrapping members are so wrapped on the outer periphery of the airbag body as to intersect with each other. Besides the intersecting portions, therefore, the outer periphery around the axis of the airbag body is restrained at a number of separated places corresponding to amount of wrapping members. As a result, it is possible to keep the more compactly folded-up state of the airbag body.

In this case, moreover, it is desired that the plurality of wrapping members wrapped on the upper side of the outer periphery of the folded airbag body be so arranged that there are different wrapping members at neighboring intersections.

With this construction, even if one wrapping member is cut, the remaining wrapping members hold the cut wrapping member on the two sides across the cut portion. Therefore, the cut wrapping member can be prevented from being loosened all over the length of the airbag body, thereby keeping the airbag body wrapped.

Moreover, it is desired that the airbag body includes a plurality of mounting portions arranged along the axial direction of the folded airbag body, for mounting the airbag body on the car body, and that the wrapping member is wrapped on the outer periphery of the folded airbag body at positions removed from the mounting portions.

If the wrapping member is wrapped on the outer periphery of the folded airbag body at positions removed from the individual mounting portions, more specifically, the individual mounting portions do not interfere with the wrapping member. Therefore, the airbag can be smoothly mounted on the car body by using the individual mounting portions. In this case, the wrapping member may be either wrapped on the airbag body while avoiding the mounting portions or partially cut at the positions of the mounting portions.

Moreover, it is desired that an adhesive is applied to the wrapping member.

With this construction, the wrapping member can be adhered to the airbag body or the like. Moreover, the wrapping member is not released from wrapping the airbag body even if partially cut.

Moreover, the wrapping member optionally includes a plurality of wrapping members intersecting each other, and the adhesive applied individually to the wrapping members adheres the wrapping members at the intersecting portions to each other. In this case, the end portions of the wrapping member need not be jointed to the airbag body so that its terminal treatment is facilitated. Especially where the silicone coating agent for imparting the heat resistance to the airbag body is applied to the outer surface of the airbag body so that the wrapping member having the adhesive applied thereto is not adhered to the airbag body, the wrapping member continues to restrain the airbag body even if partially cut.

For the treatments of ends of the wrapping members, even if the adhesive is not applied to the wrapping member, of course the terminal portions of the wrapping member may be fixed on the airbag body by a tearable tape member to be wound on the folded airbag body.

Moreover, the wrapping member may also be attached by sewing at positions where it is not exposed to the inner side of the car when the airbag body is extended/inflated.

With this construction, the wrapping member is jointed at the stitched portions to the airbag body even if the wrapping is ruptured when the airbag body is extended/inflated. Therefore, the wrapping member can be prevented from scattering into the car compartment. Moreover, the stitched portions are not exposed to the car compartment when the airbag body is extended/inflated. Therefore, the wrapping member after being cut can be prevented as much as possible from contacting with the passenger.

Moreover, it is arbitrary that the pitch at which the wrapping member is wrapped on the airbag body is changed along the axial direction of the folded airbag body.

With this construction, the pitch for the wrapping member to wrap can be narrowed at the thick portions of the folded airbag body or the portions spring-back tends to occur so as to reliably keep those portions compact. Alternatively, the pitch to wrap the wrapping member can be widened to keep the wrapping member away from interfering with the mounting portions for mounting the airbag body on the car body.

According to the present invention, there is provided an airbag wrapping method for a wrapping member to prevent shifts in folds of the airbag by using a wrapping device. The airbag body is folded and housed on the peripheral edge of an opening on the inner side of a car body and is folded up generally into a rod shape so that it may be extended/inflated when an inflating gas flows thereinto so as to cover the opening. The wrapping member is made of a flexible and tearable long material and is helically wrapped on the outer periphery substantially all over the length of the airbag folded up generally into the rod shape, by using the wrapping device. The wrapping device includes a through hole and holding members arranged around the through hole for revolving around the through hole, and holding the wrapping member but able to spool off the same to the through hole. During the wrapping, moreover, the wrapping member is wrapped on the outer periphery of the airbag body by revolving the holding members around the circumference of the through hole while spooling off the wrapping member and by inserting the airbag in the completely folded state progressively along the axial direction of the airbag through the through hole.

In the wrapping method according to the present invention, the holding members are revolved around the through hole while spooling off the wrapping member. Moreover, the airbag in the completely folded state is inserted progressively along the axial direction thereof through the through hole. Then, the individual airbag bodies can be wrapped helically on their outer peripheries with the wrapping member. Moreover, the wrapping member is not cut during the wrapping work but can wrap the continuing individual airbag bodies. In other words, the continuous wrapping member need neither be cut nor be jointed at their terminals individually to the second and succeeding airbag bodies. Merely by inserting the succeeding airbag bodies succeeding the leading airbag body into the through hole, moreover, the continuing wrapping members are sequentially wrapped on the succeeding airbag bodies. Therefore, the wrapping work can be done very efficiently.

BRIEF DESCRIPTION OF THE DRAWINGS

FIG. 4 is a schematically enlarged sectional view of a portion IV—IV of FIG. 1;

Of FIGS. 5A to 5C presenting front views showing an airbag assembly of the embodiment.

Of FIGS. 9A to 9C presenting enlarged perspective views showing an intersecting portion of wrapping members of the embodiment.

Of FIGS. 10A and 10B showing the state in which the airbag bodies folded are jointed to each other.

Of FIGS. 11A and 11B showing the wrapping operation of the airbag of the embodiment.

DESCRIPTION OF THE PREFERRED EMBODIMENTS

Figure 1:
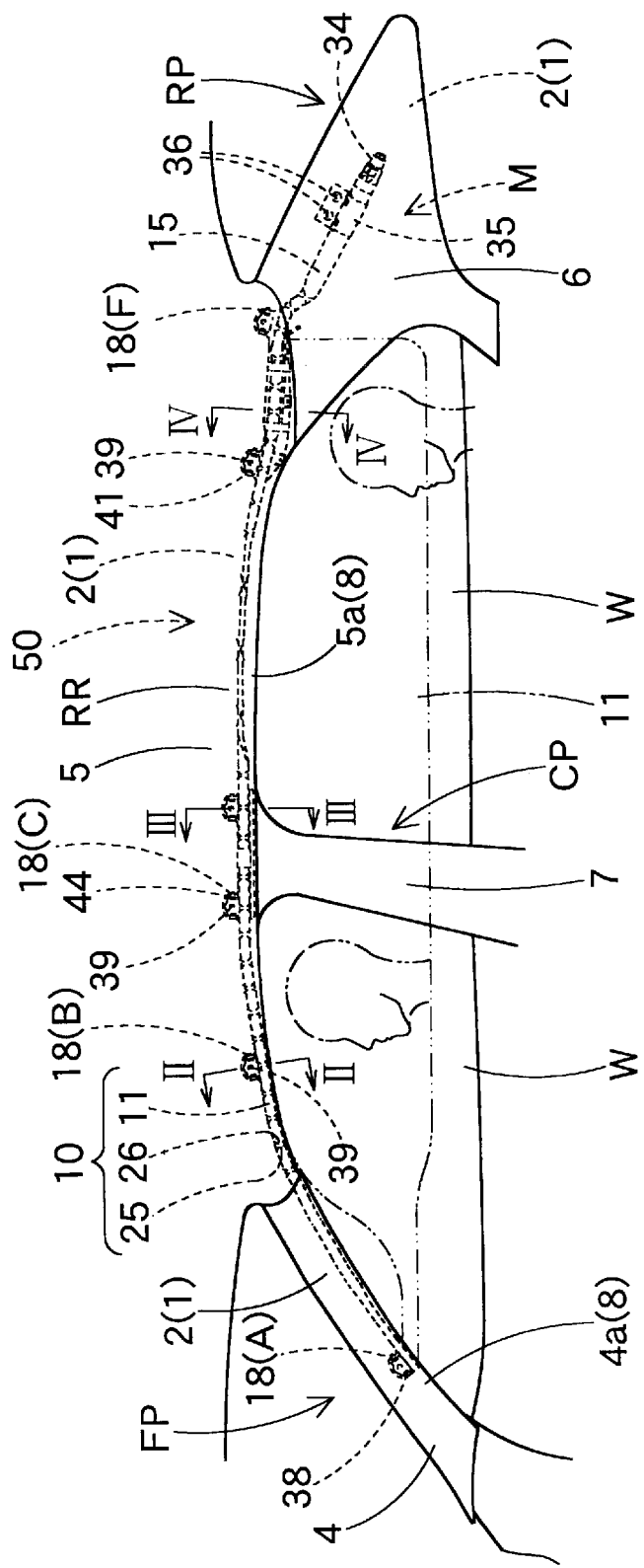
FIG. 1 is a front elevation, as taken from the inside of a car, of a head protecting airbag device using an air bag according to one embodiment of the invention.

The invention will be described below by way of embodiments shown in the drawings. In addition, the invention is not limited to the embodiments. All modifications within the requirements of the claims and equivalents with respect to the requirements should be included in the scope of the claims.

An airbag 10 of an embodiment is used in a head protecting airbag device M to be mounted on a vehicle, as shown in FIGS. 1 to 4. The airbag 10 is wrapped, with its body 11 being folded, by wrapping members 25 and 26. In this state, moreover, the airbag 10 is arranged on the inner side of the car over the front pillar portion FP, roof side rail portion RR and rear pillar portion RP of the upper peripheral edges of the openings W of the door and window.

The head protecting airbag device M is constructed to include the airbag 10, an inflator 34, mounting brackets 35, 38, 41 and 44, and an airbag cover 8.

The inflator 34 acts as a cylinder type to feed an inflating gas to the airbag 10 folded. On this inflator 34, there is fitted a joint mouth portion 15 of the airbag 10 (or the airbag body 11). The joint mouth portion 15 is arranged in a gas inlet portion 12 of the airbag body 11.

Figure 5A:
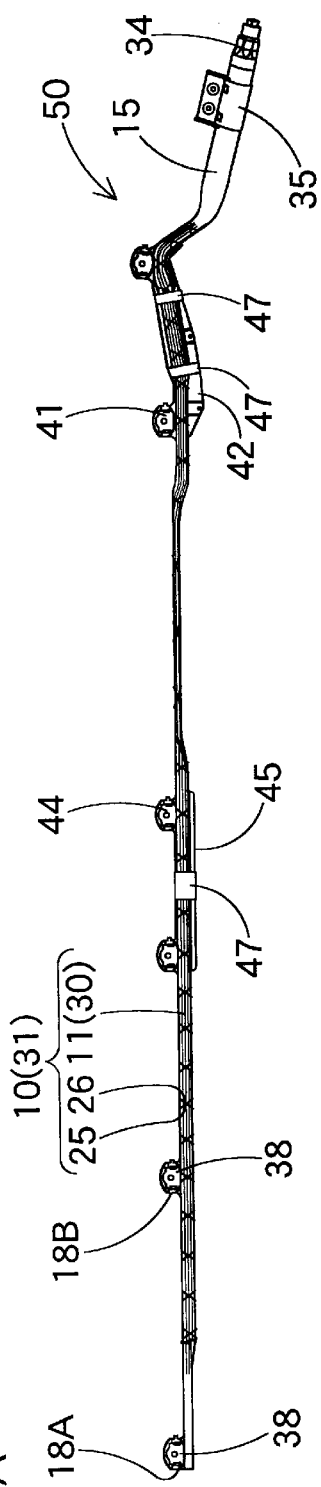
FIG. 5A is a front view of the entirety of the airbag assembly.
Figure 5B:
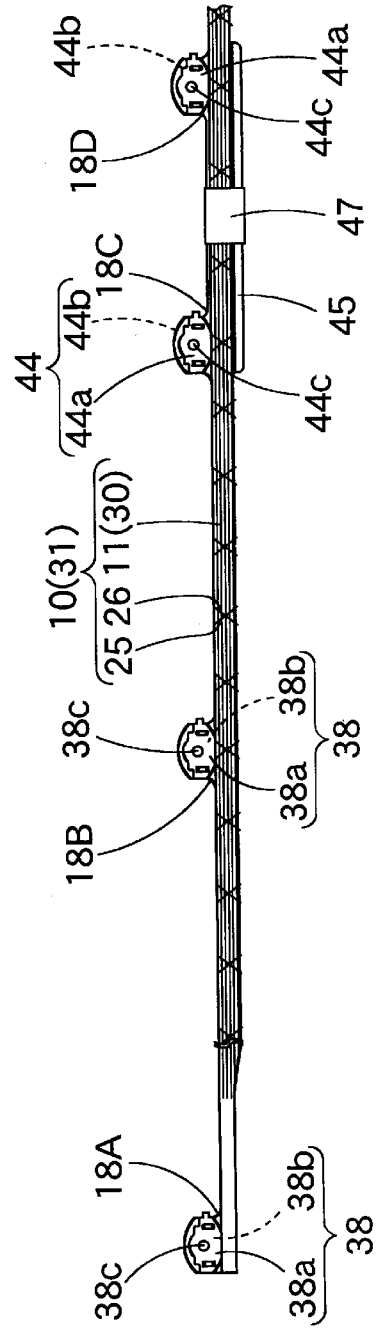
FIG. 5B is an enlarged front view of the front side of the airbag assembly.
Figure 5C:
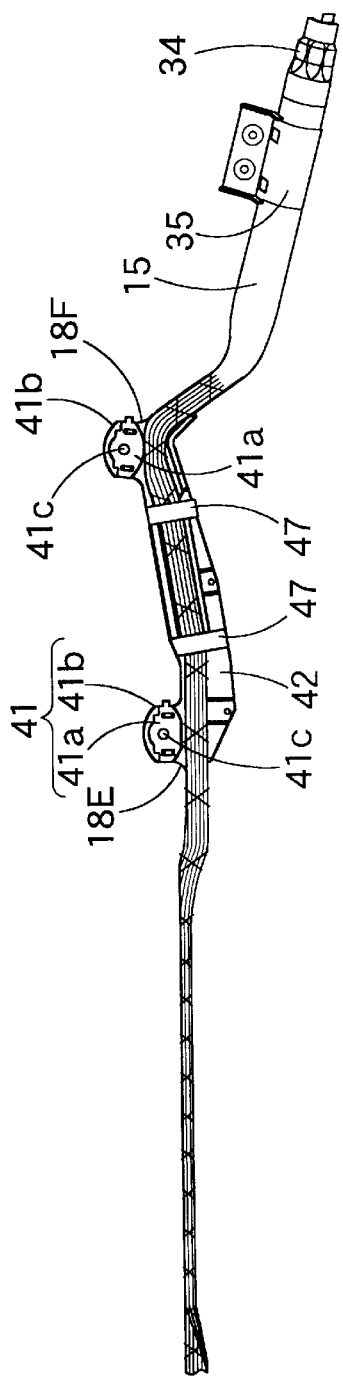
FIG. 5C is an enlarged front view of the rear side of the airbag assembly.

The mounting bracket 35 is made of a sheet metal and mounts the joint mouth portion 15 of the airbag body 11 and the inflator 34 on a car body (or a body) 1 in the inner side of the rear pillar portion RP, as shown in FIGS. 1 and 5. The bracket 35 clamps the joint mouth portion 15, as fitted on the inflator 34, from the peripheral side. Moreover, the bracket 35 is mounted on an inner panel 2 of sheet metal on the side of the body by means of two mounting bolts 36.

The airbag cover 8 is constructed to consist of lids 4a and 5a. The lid 4a is a portion of the lower edge side of the pillar garnish 6 which is arranged in the front pillar portion FP. The lid 5a is a portion of the lower edge side of a roof interior member 5 which is arranged in the roof side rail portion RR.

Figure 2:
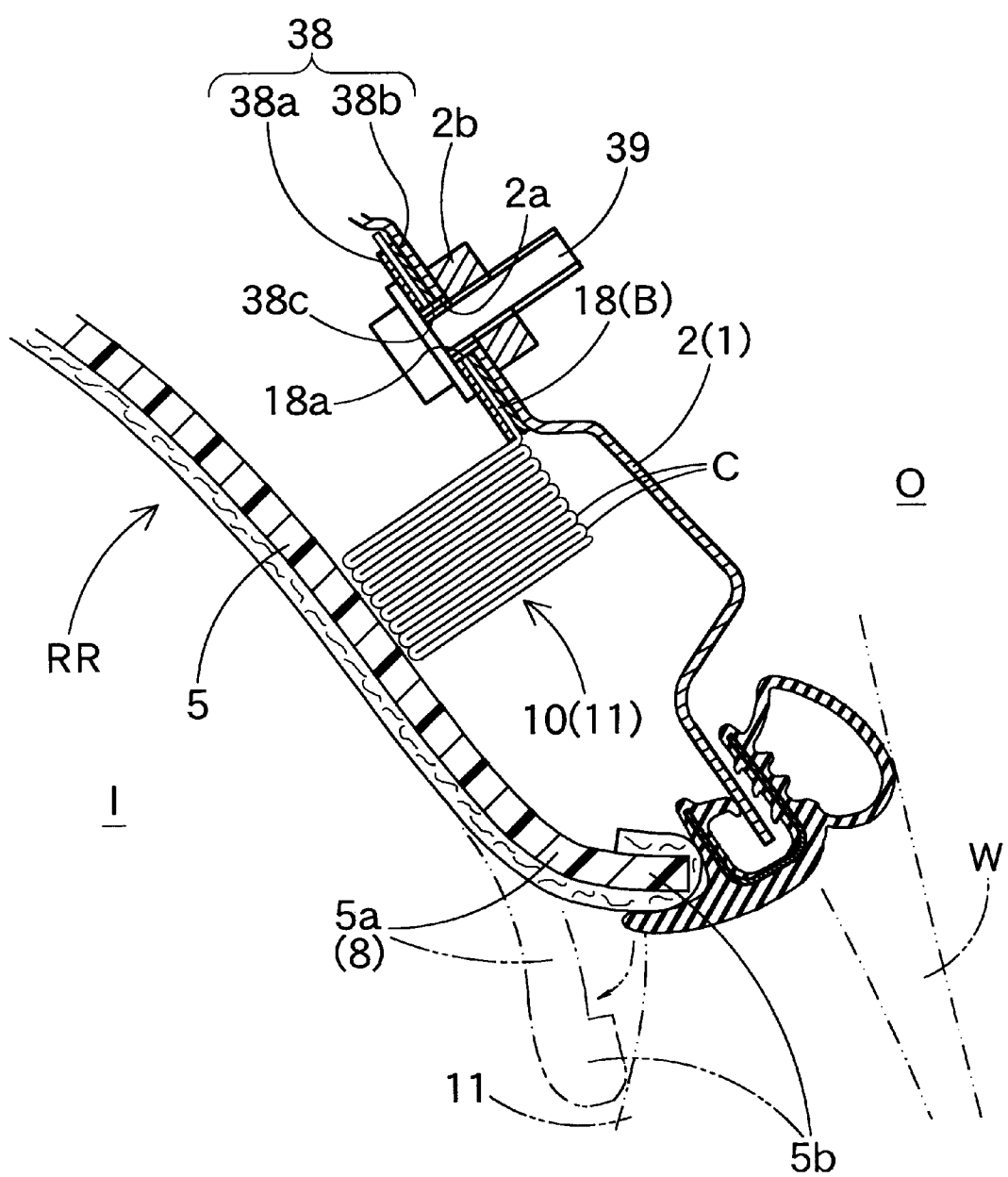
FIG. 2 is a schematically enlarged sectional view of a portion II—II of FIG. 1.
Figure 3:
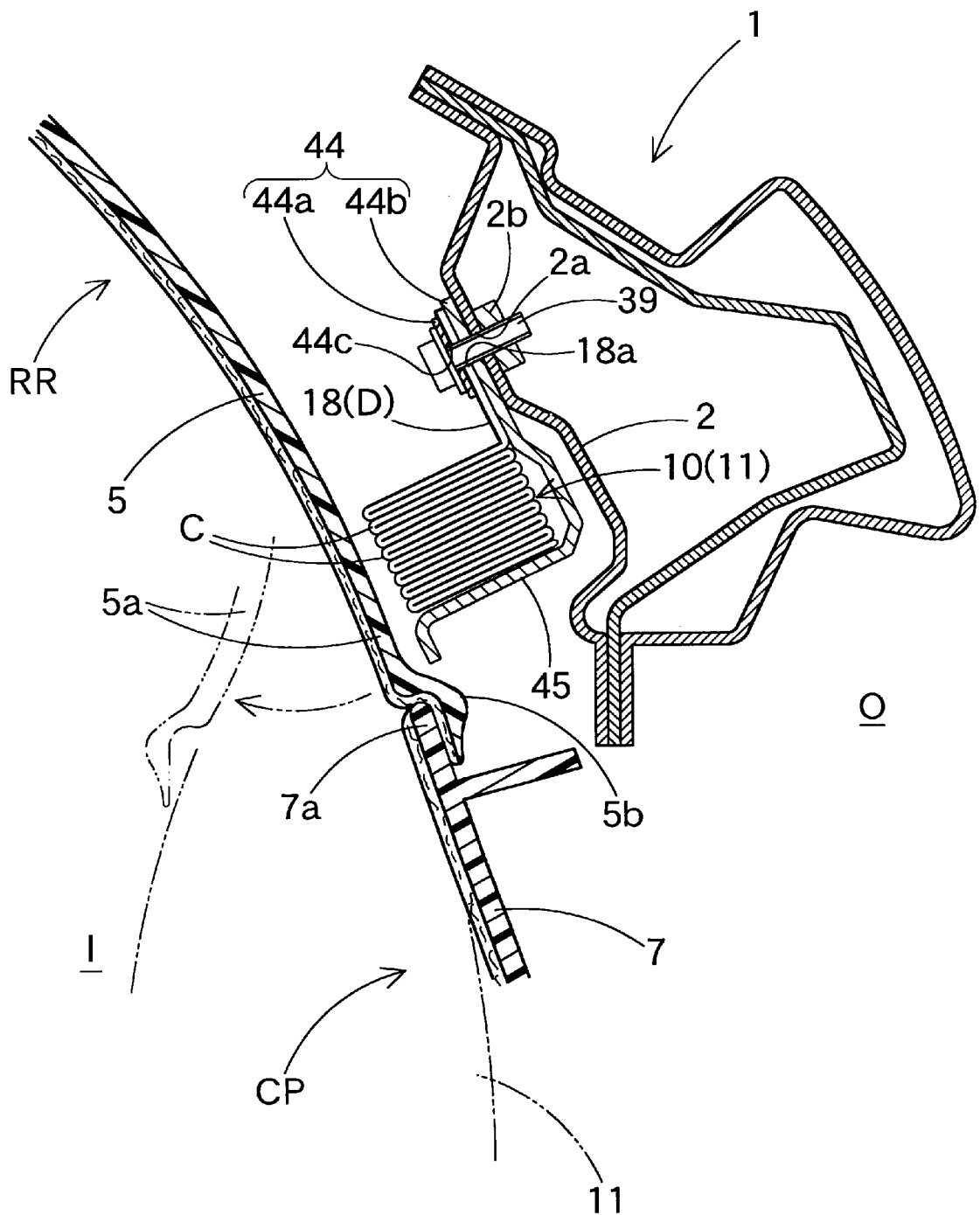
FIG. 3 is a schematically enlarged sectional view of a portion III—III of FIG. 1.

This roof interior member 5 is made of a synthetic resin and is mounted, as shown in FIGS. 1 to 4, on the inner panel 2 of the body 1 of the roof side rail portion RR by the not-shown mounting means. The inner panel 2 is a member on the inner side I of the body 1. The lid 5a on the lower edge side of the roof interior member 5 is so opened that its lower end 5b protrude into the car interior, allowing the airbag body 11 to inflate. Here, the lower end 5b of the lid 5a intrudes, at the rear pillar portion RP and a center pillar portion CP, into the outer side O of the upper ends 6a and 7a of a rear pillar garnish 6 and a center pillar garnish 7, as shown in FIGS. 3 and 4. Moreover, the lid lower end 5b is retained by those upper ends 6a and 7a.

The front pillar garnish 4 is also made of a synthetic resin and is mounted on the inner panel 2 which is arranged on the inner side of the front pillar portion FP. This inner panel 2 is also a member on the side of the body 1. The lid 4a of the garnish 4 is opened like the lid 5a to the inner side I to allow the airbag body 11 to protrude when it is extended/inflated.

Figure 7:
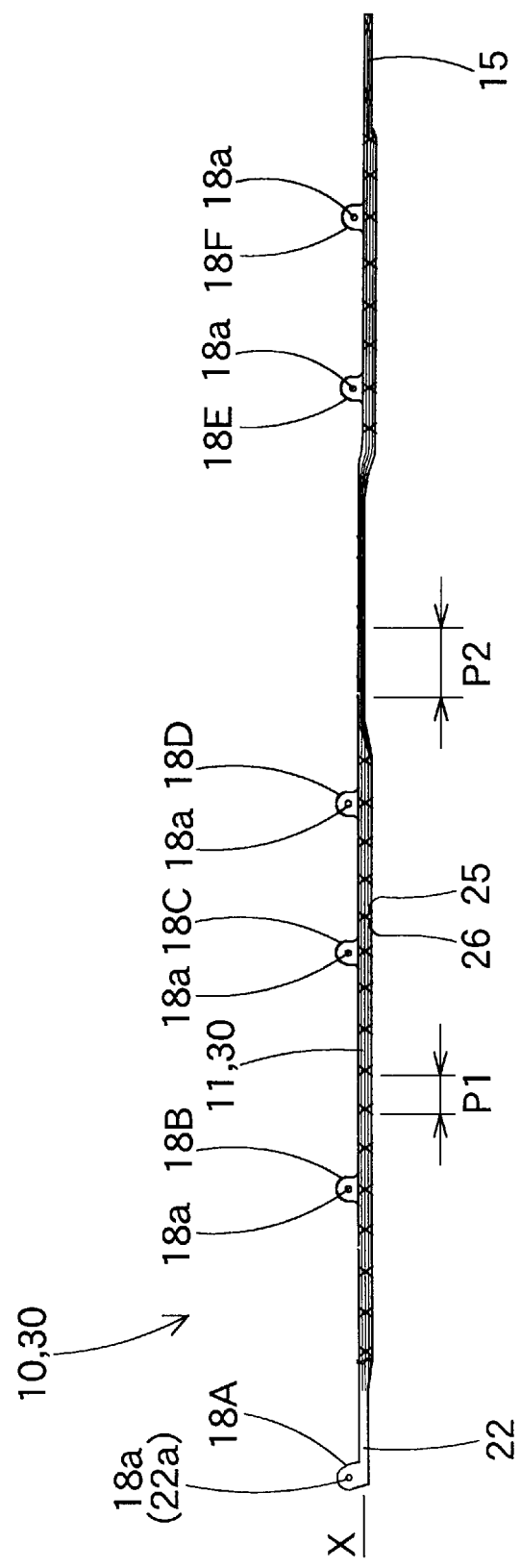
FIG. 7 is a front view showing the airbag of the embodiment.

The airbag 10 is constructed, as shown in FIGS. 1 and 7, to include the airbag body 11 and the wrapping members 25 and 26. These wrapping members 25 and 26 are made tearable to prevent the folds of airbag body 11 from shifting. The airbag body 11 is hollow-woven of polyamide thread into a flexible bag shape. Here, the airbag body 11 thus woven is coated on its outer surface side with silicone so as to improve its heat resistance.

Figure 6:
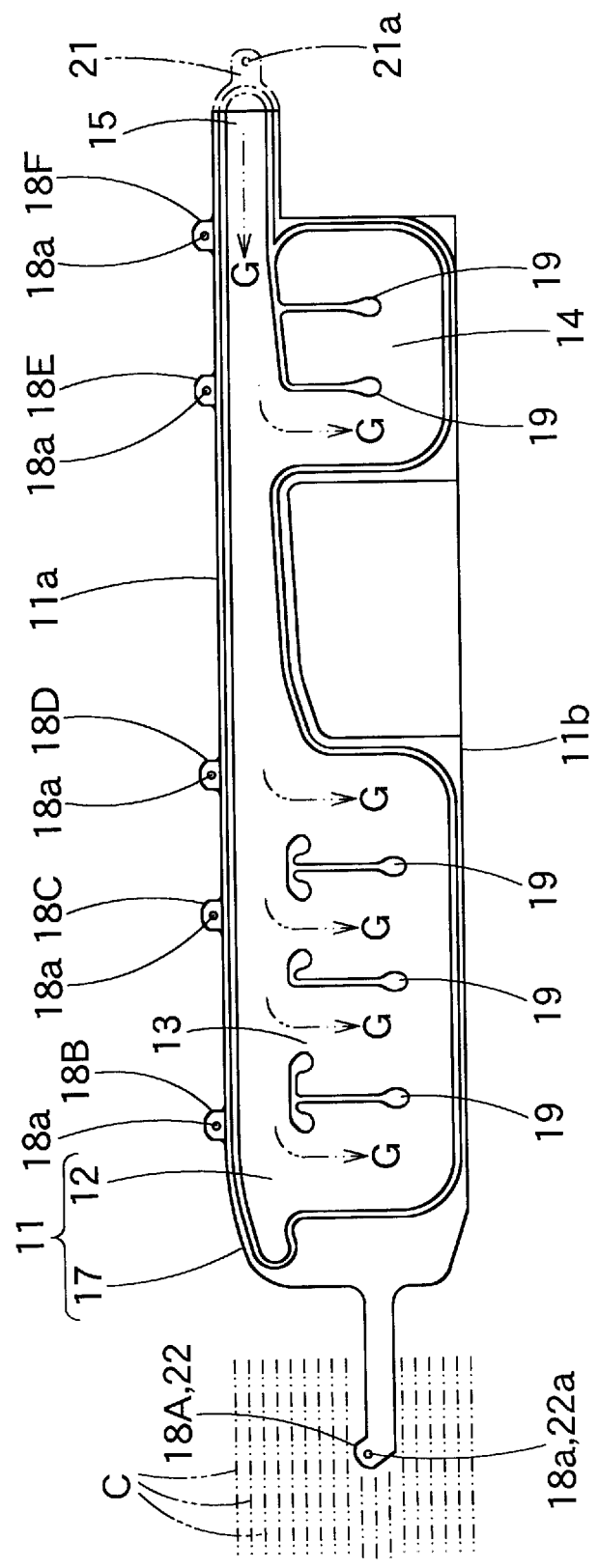
FIG. 6 is a front view showing an extended state of an airbag body in an uninflated state to be used in the embodiment.

The airbag body 11 is constructed, as shown in FIG. 6, to include the gas inlet portion 12 for accepting the inflating gas from the inflator 34, and a non-inlet portion 17 that accepts no inflating gas.

Figure 10A:
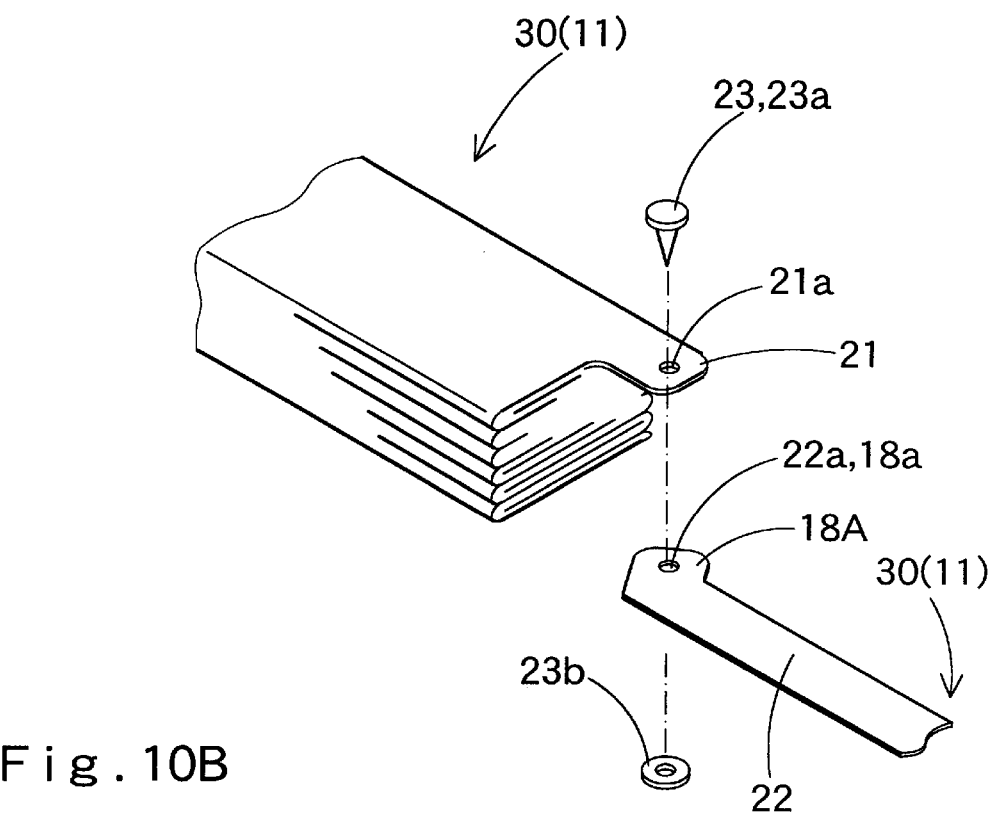
FIG. 10A shows the state just before the joint.
Figure 10B:
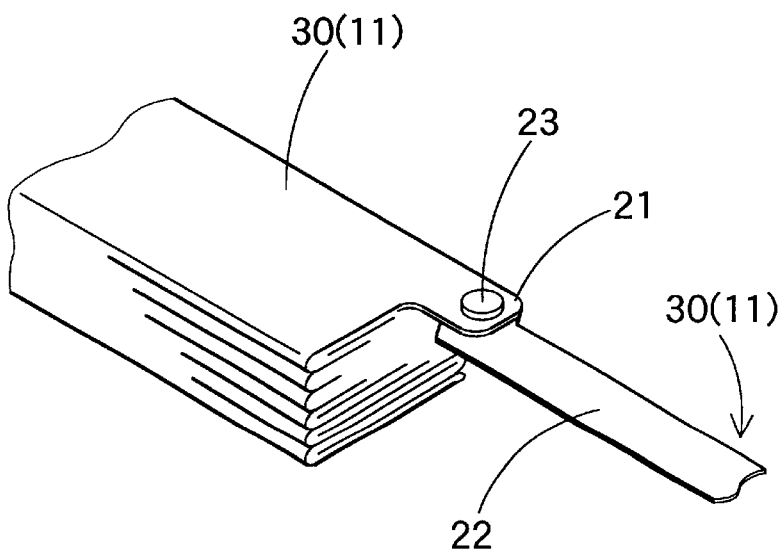
FIG. 10B shows the state just after the joint.
Figure 11A:
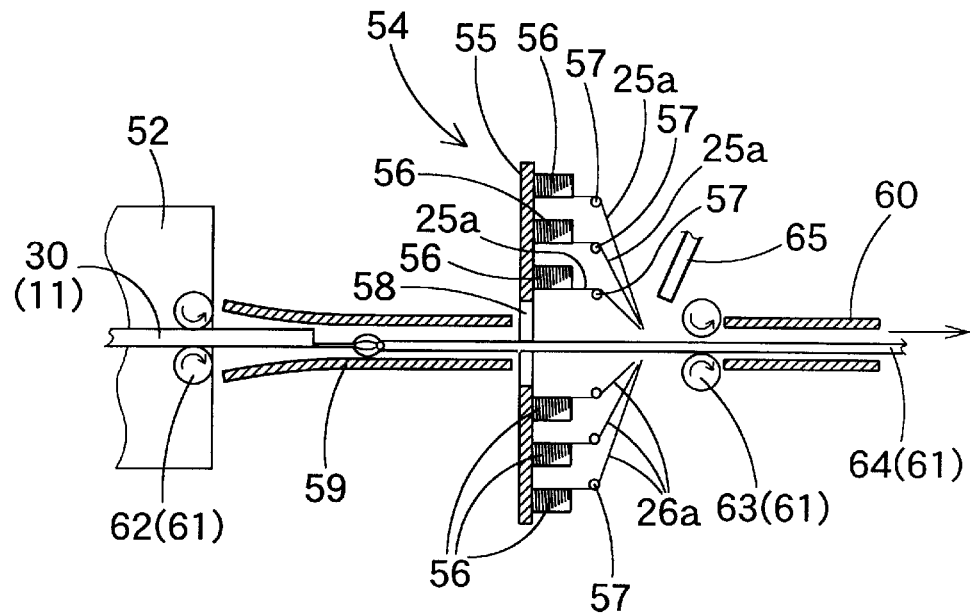
FIG. 11A shows the state just before the wrapping.
Figure 11B:
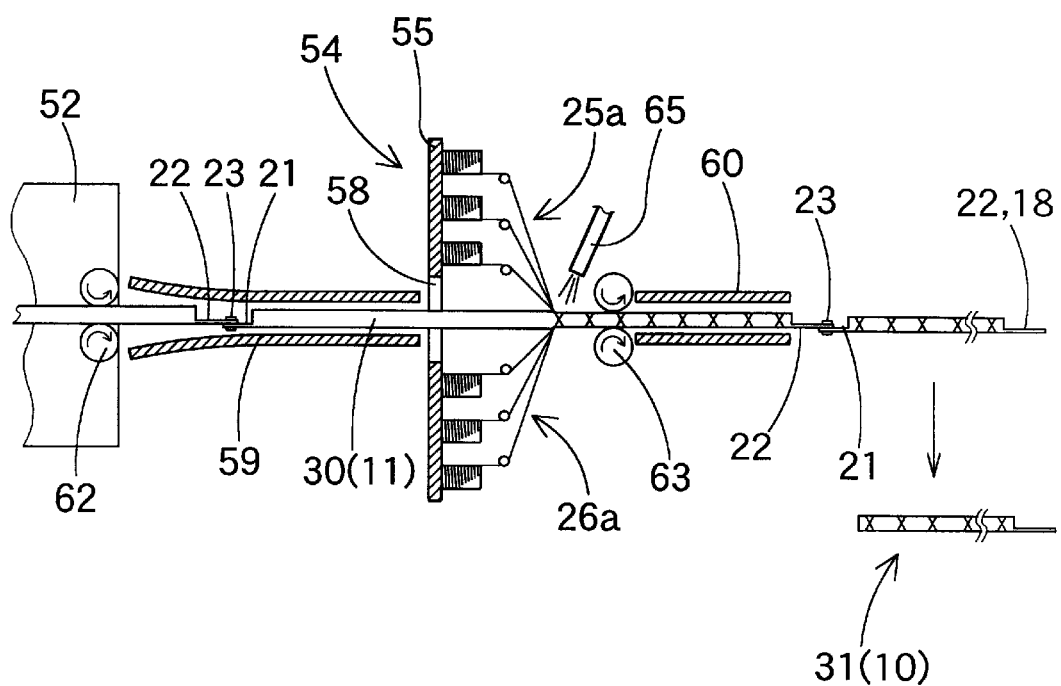
FIG. 11B shows the state during the wrapping.

The gas inlet portion 12 is constructed to include a front inflatable portion 13, a rear inflatable portion 14 and the joint mouth portion 15. The front inflatable portion 13 is extended/inflated to the outer side of the front seat when the inflating gas flows in. The rear inflatable portion 14 is extended/inflated to the outer side of the rear seat when the inflating gas flows in. The joint mouth portion 15 is protruded generally in a cylindrical shape backward from the rear end upper portion of the rear inflatable portion 14. Here, a joint portion 21 is formed at the rear end of the joint mouth portion 15 at the initial time when the airbag body 11 is hollow-woven. The joint portion 21 is provided for jointing the folded airbag bodies 11 sequentially and for wrapping them sequentially. This joint portion 21 is jointed, as shown in FIGS. 10 and 11, to a joint portion 22 of the succeeding airbag body 11 by using a joint pin 23. Moreover, the joint portion 21 is removed together with the joint pin 23 after the end of the wrapping work. Moreover, the joint mouth portion 15 after the joint portion 21 is removed is so opened at its rear end as to allow insertion of the inflator 34 thereinto. The joint pin 23 is constructed to include a pin body 23a and a retaining ring 23b. This retaining ring 23b is retained on the pin body 23a by inserting the pin body 23a thereinto.

The non-inlet portion 17 is arranged to enclose the gas inlet portion 12. On the upper edge side of the non-inlet portion 17, there are arranged a plurality of mounting portions 18. These mounting portions 18 are provided for mounting the airbag body 11 on the inner panel 2 of the body 1. Moreover, the non-inlet portion 17 is provided with regulating portions 19 which are arranged in the regions of the front inflatable portion 13 and the rear inflatable portion 14. The regulating portions 19 are so arranged as to joint the inner side wall portion and the outer side wall portion of the gas inlet portion 12 at the inflating time. The regulating portions 19 regulate the thicknesses of the front inflatable portion 13 and the rear inflatable portion 14 when inflating to be substantially equal. The regulating portions 19 are arranged to create tension in the inflated airbag body 11 in the longitudinal direction of the vehicle from the mounting portion 18A on the front end side to the mounting portion 18F on the rear end side.

Here, the mounting portion 18A on the front end side of the airbag body 11 also is used in this embodiment as the joint portion 22. This joint portion 22 is jointed to the joint portion 21 of the airbag body 11 which is positioned on the front side when wrapping.

Here will be described the flow of the inflating gas G in the airbag body 11 (referred to FIG. 6). The inflating gas G flows from the joint mouth portion 15, on which the inflator 34 is mounted, and further flows through the upper portion of the rear inflatable portion 14 on the rear side to the upper portion of the front inflatable portion 13 on the front side. Then, the gas G flows through the lower portion of the front inflatable portion 13 to inflate the front inflatable portion 13 as a whole. Simultaneously with this, the gas G flows from the upper portion to the lower portion of the rear inflatable portion 14 to inflate the rear inflatable portion 14 as a whole. As a result, the inflation of the airbag body 11 is completed.

Each mounting portion 18 is provided with a mounting hole 18a at its center. Into the mounting hole 18a, there is inserted a mounting bolt 39 (as referred to FIGS. 2 and 3). The mounting hole 18a is formed by punching the airbag body 11 after this airbag body 11 was hollow-woven.

To the individual mounting portions 18, moreover, there are fixed the mounting brackets 38, 41 and 44 of a sheet metal, as shown in FIGS. 1 to 3 and FIG. 5. These brackets 38, 41 and 44 firmly mount the folded airbag body 11 on the inner panel 2 on the side of the body 1.

The mounting bracket 38 is made of a sheet metal and constructed to include an inner plate 38a on the inner side I and an outer plate 38b on the outer side O, as shown in FIGS. 1, 2 and 5. Moreover, the bracket 38 clamps the two mounting portions 18A and 18B on the front side individually by its plates 38a and 38b. The inner plate 38a and outer plate 38b are provided with mounting holes 38c corresponding to the mounting holes 18a of the individual mounting portions 18A and 18B. Moreover, the individual mounting portions 18A and 18B are mounted on the inner panel 2 by using the mounting bolts 39 and the bracket 38, as shown in FIG. 2. Each bolt 39 is fastened through the mounting holes 38c and 18a by a nut 2b. The nut 2b is fixed on the circumference of a mounting hole 2a of the inner panel 2.

The mounting bracket 41 clamps two mounting portions 18E and 18F individually on the rear side, as shown in FIGS. 1 and 5. Like the bracket 38, the bracket 41 is provided with an inner plate 41a on the inner side I and an outer plate 41b on the outer side O. Moreover, the bracket 41 is arranged over the garnish 6 of the rear pillar portion RP on the inner side I. The inner plate 41a and the outer plate 41b are individually provided with mounting holes 41c corresponding to the mounting holes 18a of the individual mounting portions 18E and 18F.

The mounting bracket 44 clamps two mounting portions 18C and 18D midway along the airbag's length, as shown in FIGS. 1, 3 and 5. Like the mounting bracket 38, the bracket 44 is provided with an inner plate 44a on the inner side I and an outer plate 44b on the outer side O. Moreover, the bracket 44 is arranged over a garnish 7 of the center pillar portion CP on the inner side I. The inner plate 44a and the outer plate 44b are individually provided with mounting holes 44c corresponding to the mounting holes 18a of the individual mounting portions 18C and 18D.

Moreover, the two mounting brackets 41 are jointed to each other on the lower end sides of the outer plates 41b and 41b. Likewise, the two mounting brackets 44 are also jointed to each other on the lower end sides of the outer plates 44b and 44b. These jointed portions construct regulating portions 42 and 45, as shown in FIGS. 3 to 5. These individual regulating portions 42 and 45 prevent the airbag body 11 from intruding into the outer side O of the garnishes 6 and 7 at the initial stage of the inflation of the airbag body 11. Moreover, each of the regulating portions 42 and 45 is formed into an L-shaped section which has a portion for supporting the lower face side of the folded airbag 10 and a portion for supporting the outer side face of the folded airbag 10.

The wrapping members 25 and 26 are individually formed by weaving a plurality of threads such as polyester threads, polyamide threads or urethane threads. In the case of the embodiment, as shown in FIGS. 9 and 11, the wrapping members 25 and 26 are formed by using three polyester threads 25a and 26a. In the case of the embodiment, moreover, a thermoset type adhesive 28 is applied to the surfaces of the threads of the wrapping members 25 and 26 (as referred to FIG. 8). Here, each of the wrapping members 25 and 26 is set at such a suitable tensile strength within a range of 0.49 to 98 N (50 gf to 10 Kgf) that it may be ruptured when the wrapped airbag body 11 is extended/inflated.

Figure 8:
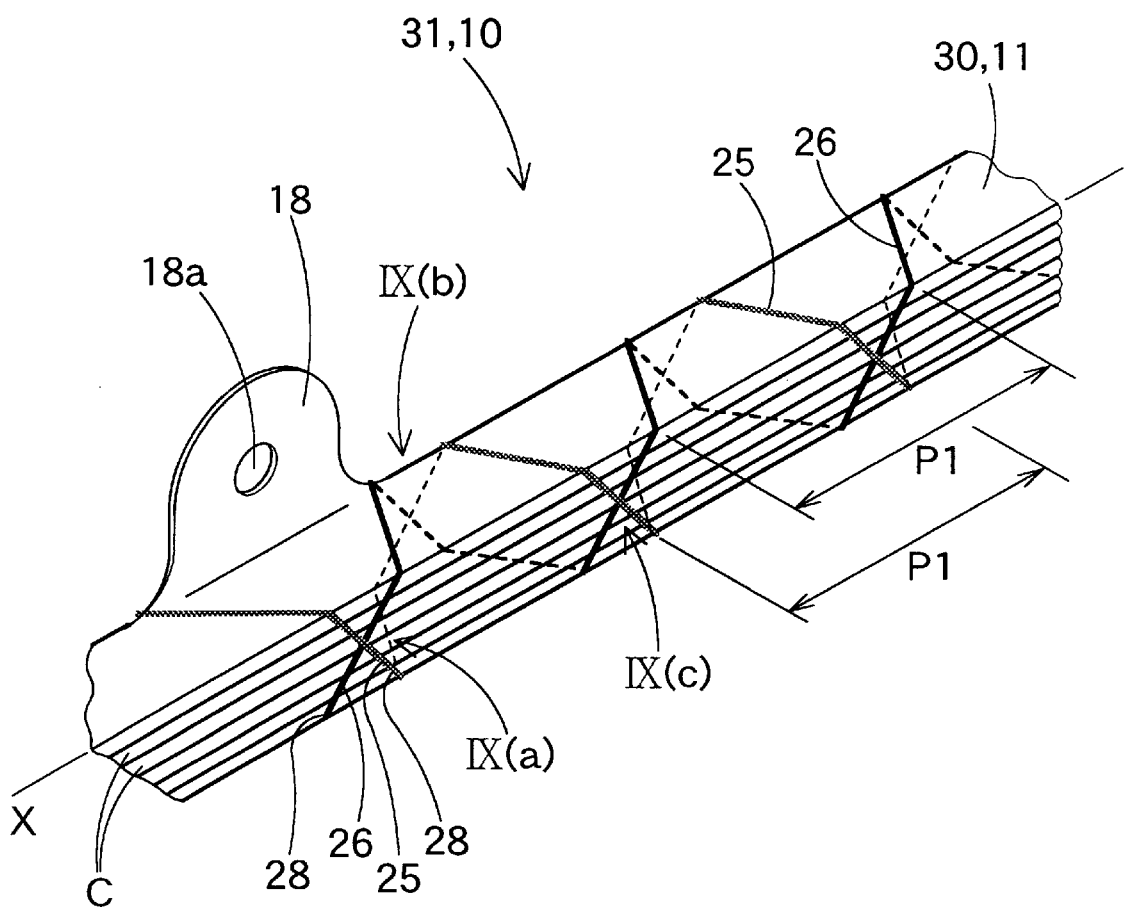
FIG. 8 is a perspective view of a portion of the airbag of the embodiment.

Moreover, each of the wrapping members 25 and 26 is wrapped on the airbag body 11 folded into a rod shape, (called here the "folded body 30") all over the airbag's length, as shown in FIGS. 7 and 8. Moreover, each wrapping member 25 and 26 is so wrapped on the outer periphery of the folded body 30 as to extend along the axial direction X of the body 30 and to intersect the axial direction X obliquely. In the case of the embodiment, each wrapping members 25 and 26 is helically wrapped around the body 30 from the front end side to the rear end side.

Figure 9A:
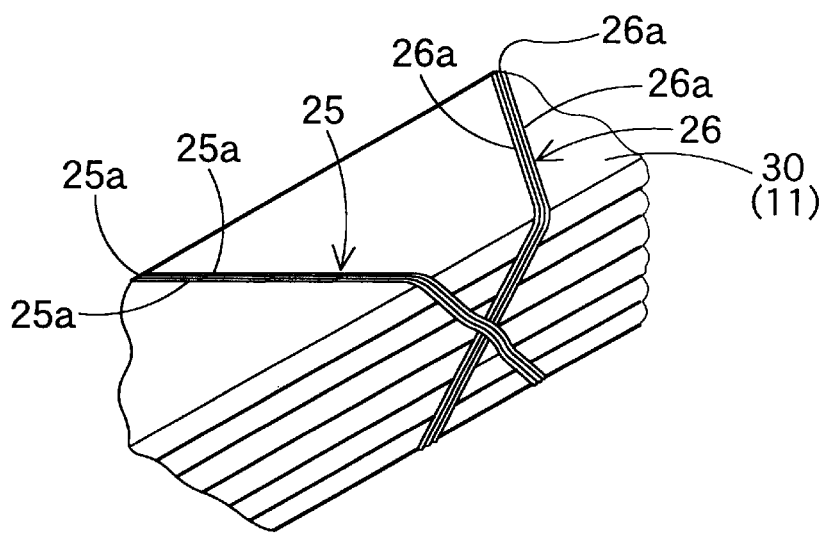
FIG. 9A corresponds to a portion IX(A) of FIG. 8.
Figure 9B:
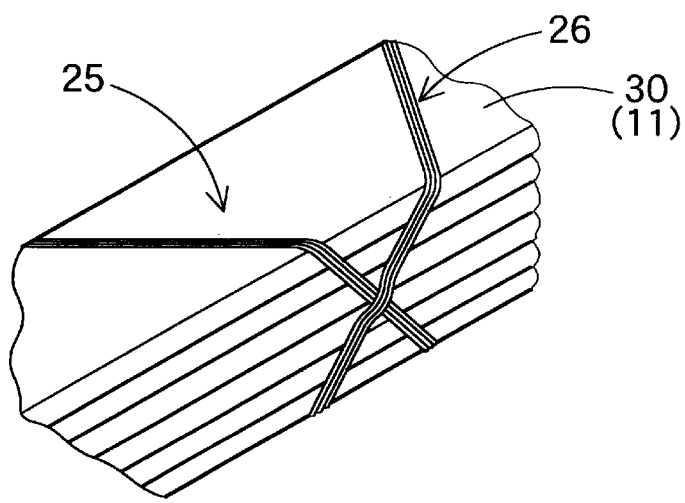
FIG. 9B corresponds to a portion IX(B) of FIG. 8.
Figure 9C:
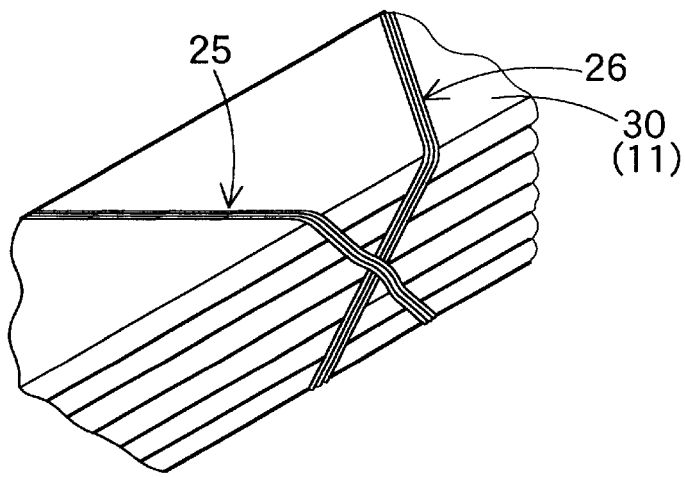
FIG. 9C corresponds to a portion IX(C) of FIG. 8.

In the case of the embodiment, moreover, each wrapping members 25 and 26 is so wrapped on the outer periphery of the folded body 30 as to intersect with each other. Still further, the wrapping members 25 and 26 are so wrapped on the outer periphery of the body that the wrapping members 25 or 26, alternate in the positions of their intersections over the outer surface of the body 30, different wrapping members 26 or 25 at adjoining intersecting portions. In the case of the embodiment, specifically, the wrapping members 25 and 26 are so wrapped that the reinforcing threads are braid-laced with two threads when a reinforcing hose is knitted and braided. More specifically, if in the predetermined intersections positioned from the front end to the rear end of the body 30 the wrapping member 25 is arranged to be over the wrapping member 26 at the front most intersection so as to hold the wrapping member 26, as shown in FIGS. 8 and 9A, the wrapping member 26 is arranged at the following intersecting portion above the wrapping member 25, as shown in FIG. 9B. At the following intersecting portion, moreover, the wrapping member 25 is arranged over the wrapping member 26 as to hold the wrapping member 26, as shown in FIG. 9C.

In the case of the embodiment, still further, the pitch P1 of the wrapping members 25 and 26 by which the folded body 30 is helically wrapped is so set that the wrapping members 25 and 26 may wrap the body 30 without any interference with the individual mounting portions 18, wrapping at positions removed from the individual mounting portions. Moreover, the pitch P2 at the thinner portions of the folded body 30 is set so wide as to make the amount of the wrapping members 25 and 26 as small as possible.

Here will be described the assembly of the head protecting airbag device M of the embodiment. First of all, the airbag body 11 is folded up. When this airbag body 11 is to be folded up, it is folded up generally into a vertical bellows shape in its uninflated, flatly extended state, as shown in FIG. 6. Specifically, the airbag body 11 is so folded up in the bellows shape having folds C parallel to its upper edge 11a that its lower edge 11b may come closer to the upper edge 11a. After this folding operation, moreover, the folded body 30 is wrapped by the wrapping members 25 and 26 to form a wrapped airbag 31.

In the case of the embodiment, a predetermined folding device 52, as well known in the art by Unexamined Published Japanese Patent Application 43004/1999, is used for folding up the airbag body 11. For the wrapping work using the wrapping members 25 and 26, moreover, there is used a wrapping device 54 which is connected to the folding device 52.

The wrapping device 54 is similar, as shown in FIG. 11, to a braiding machine which is used for forming the braided layer of the reinforcing hose. Moreover, the wrapping device 54 is constructed to include a bobbin carrier 55, guides 59 and 60 and transfer means 61. The bobbin carrier 55 rotates while retaining six bobbins 56. The guide 59 is formed into a tapered tube for guiding the folded airbag body 11 (or the folded body 30) into a center through hole 58 of the bobbin carrier 55. The guide 60 is formed into a generally square annular shape for guiding the wrapped airbag 31 having left the through hole 58 and wrapped with the wrapping members 25 and 26. The transfer means 61 transfers the body 11 or the wrapped airbag 31. In the bobbin carrier 55, there are arranged the bobbins 56 and adhesive applicator rollers 57. The bobbins 56 are holding members for winding and holding the six polyester threads 25a and 26a comprising the wrapping members 25 and 26, individually. The adhesive applicator rollers 57 apply the thermoset type adhesive 28 to the individual threads 25a and 26a. Between the bobbin carrier 55 and the guide 60, there is arranged a heating device 65. This heating device 65 heats to set the adhesive 28 and establishes an adhesion in the adhesive 28.

The transfer means 61 is constructed to include transfer rollers 62 and 63 and a hook 64. The transfer roller 62 is arranged on the side of the folding device 52 and is rotationally driven to insert the folded body 30 into the through hole 58 of the bobbin carrier 55. The transfer roller 63 is arranged in front of the bobbin carrier 55 and is rotationally driven to extract the wrapped airbag 31 from the through hole 58 of the bobbin carrier 55. The hook 64 is inserted from the front side of the guide 60 through the guide 60, the through hole 58 of the bobbin carrier 55, and the guide 59. Moreover, the hook 64 grips and pulls the initial folded body 30 when wrapping. At this time, the hook 64 transfers the body 30 to be wrapped to the position of the transfer roller 63.

In the wrapping work using the wrapping device 54, the transfer means 61 and the heating device 65 are activated at first. Moreover, the folded bodies 30 folded by the folding device 52 are sequentially jointed and are sequentially transferred. At this time, the wrapping work can be done by rotating the bobbin carrier 55 around the through hole 58 while spooling off the threads 25a and 26a of the wrapping members 25 and 26.

The sequentially jointed individual bodies 30 are transferred when the preceding folded body 30 is transferred by the hook 64 and the transfer roller 62 so that the succeeding folded body 30 is discharged from the folding device 52. At this time, the rear side joint portion 21 of the preceding body 30 and the front side joint portion 22 of the succeeding body 30 are jointed to each other. For these joints of the joint portions 21 and 22, the pin body 23a of the joint pin 23 is inserted at first into the joint holes 21a and 22a (or 18a) of the individual joint portions 21 and 22. Then, the jointing work can be completed by fitting the retaining ring 23b on the leading end of the pin body 23a.

As the folded body 30 passes the through hole 58 of the rotating bobbin carrier 55, moreover, the wrapping members 25 and 26 are wrapped on the individual bodies 30 by braiding the two wrapping members 25 and 26. Here, these wrapping members 25 and 26 are wrapped on the bodies 30 while being coated with the adhesive 28. After this, the adhesive 28 is set by the heating device 65 so that the wrapping members 25 and 26 are adhered to each other at the intersecting portions. Moreover, the coating agent of silicone is applied to the outer surface of the airbag body 11 so that the wrapping members 25 and 26 do not adhere firmly to the outer periphery of the folded body 30.

When the wrapped airbag 31 having the wrapping members 25 and 26 wrapped thereon is discharged from the guide 60, the wrapping members 25 and 26 are cut at the joint portion of the wrapped airbag 31. Moreover, the joint portion 21 is cut off, and the joint pin 23 is pulled out from the joint holes 21a and 22a. Then, the sequence of front side airbags 31 (or the airbags 10) is taken out from the wrapping device 54 (as referred to FIGS. 11B and 7).

After the wrapping is over, moreover, the mounting brackets 38 are individually mounted on the mounting portions 18A and 18B of the front side of the completely wrapped airbag 31. Moreover, the mounting brackets 44 having the regulating portions 45 are mounted on the intermediate mounting portions 18C and 18D. Still further, the mounting brackets 41 having the regulating portions 42 are mounted on the rear side mounting portions 18E and 18F. Furthermore, tearable tape members 47 are wrapped the airbag 31 and the regulating portions 42 and 45 so that the brackets 41 and 44 and the airbag 31 will not separate.

After the tape members 47 are wound, the wrapping members 25 and 26 are cut off to eliminate the fold at the joint mouth portion 15. Then, the inflator 34 is inserted into the joint mouth portion 15, and the mounting bracket 35 is mounted on the outer circumference of the joint mouth portion 15. As a result, an airbag assembly 50 is formed, as shown in FIG. 5.

After this, the individual mounting brackets 35, 38, 41 and 44 are arranged at the predetermined positions of the inner panel 2, and the bolts 36 and 39 are inserted into the individual mounting holes 18a, 38c, 41c and 44c. When the individual mounting brackets 35, 38, 41 and 44 are fixed on the inner panel 2, moreover, the airbag assembly 50 can be mounted on the body 1. Next, the front pillar garnish 4 and the roof interior member 5 are mounted on the body 1, and the rear pillar garnish 6 and the center pillar garnish 7 are mounted on the body 1. Then, the head protecting airbag device M can be mounted on the vehicle.

If the inflator 34 is activated after the device M is mounted on the vehicle, the inflating gas from the inflator 34 flows from the joint mouth portion 15 into the front inflatable portion 13 and the rear inflatable portion 14 so that the airbag body 11 is inflated, while eliminating the folds, to rupture the wrapping members 25 and 26 and the tape members 47. Moreover, the airbag body 11 pushes and opens the lids 4a and 5a of the front pillar garnish 4 and the roof interior member 5 until it inflates to great size to cover the opening W, as indicated by double-dotted lines in FIGS. 1 to 4.

In the airbag 10 of the embodiment, moreover, the elongated wrapping members 25 and 26 are not intermittently arranged along the axial direction X of the folded, rod-shaped airbag body 11 (or the folded body 30), as shown in FIGS. 7 and 8. Specifically, the wrapping members 25 and 26 are wrapped obliquely to the folded body 30 axial direction X and so are helically wrapped on the outer periphery of the body 30 substantially all over the length. As a result, the wrapping members 25 and 26 restrain the outer periphery of the folded body 30 at least at one portion of each position along the axis of the body 30. Therefore, the wrapping members 25 and 26 can keep the airbag body 11 in the compactly folded state uniformly along the axial direction X of the folded body 30. Moreover, what is required for the wrapping operation is simply to wrap the wrapping members 25 and 26 helically over the outer periphery of the folded body 30 as to intersect the axial direction X of the folded body obliquely. Therefore, the wrapping can be simply done.

In the airbag 10 of the embodiment, therefore, the compactly folded state of the airbag body 11 can be uniformly maintained substantially all along the length of the folded body 30 by a simple wrapping operation.

In the embodiment, moreover, the two wrapping members 25 and 26 are so wrapped on the outer periphery of the folded body 30 as to intersect with each other. Excepting the intersecting portion, therefore, the outer periphery around the axis of the folded body 30 is held by the individual wrapping members 25 and 26 at two portions, there being two wrapping members 25 and 26, and furthermore at positions removed from each other. As a result, the airbag 10 can keep the folded state of the airbag body 11 more compactly.

Here, three or more wrapping members may be used for wrapping them with the intersecting portions. It is also optional to wrap the wrapping members helically on the outer periphery of the folded body 30 by using only one of the wrapping members 25 and 26 without considering the aforementioned points. At this time, while the wrapping member is wrapped helically with respect to the body 30 at portions other than the mounting portions 18, the pitch is narrowed. In this case, too, the wrapping member restrains the outer periphery of the folded body 30 at least at one portion of each position along the axis of the body 30 substantially all along the length of the body 30. Therefore, the state of the compactly folded body 30 can be uniformly maintained along the axial direction X of the body 30. Where the pitch to wrap the wrapping member is thus narrowed, the number of threads composing the wrapping member may be reduced to one.

In the embodiment, moreover, the wrapping members 25 and 26 are so wrapped on the outer periphery of the folded airbag body 11 that the wrapping member 26 or 25 which takes the upper position at their intersections over the outer surface of the airbag body 11, changes at each adjoining intersecting portion. Even if for instance one wrapping member 25 is cut at a central portion of the completely wrapped airbag 31, therefore, the other wrapping member 26 holds the cut wrapping member 25 on the two sides adjacent to the cut portion. Therefore, the cut wrapping member 25 is prevented from becoming loose all over the length of the airbag body 11. Therefore, the cut wrapping member 25 can wrap the airbag body 11 excepting between the intersections adjacent to the cut portion.

In the embodiment, moreover, the airbag body 11 is made such that the mounting portions 18 for mounting it on the car body are arranged in plurality along the axial direction X of the folded airbag body 11. However, the wrapping members 25 and 26 are wrapped on the outer periphery of the folded airbag body 11 at positions away from the individual mounting portions 18 by adjusting the wrapping pitch P1. In other words, the individual mounting portions 18 have no interference with the wrapping members 25 and 26. Therefore, the brackets 38, 41 and 44 can be mounted without any trouble on the individual mounting portions 18. Moreover, the airbag 10 can be smoothly mounted on the body 1 by using the individual mounting portions 18.

Figure 12:
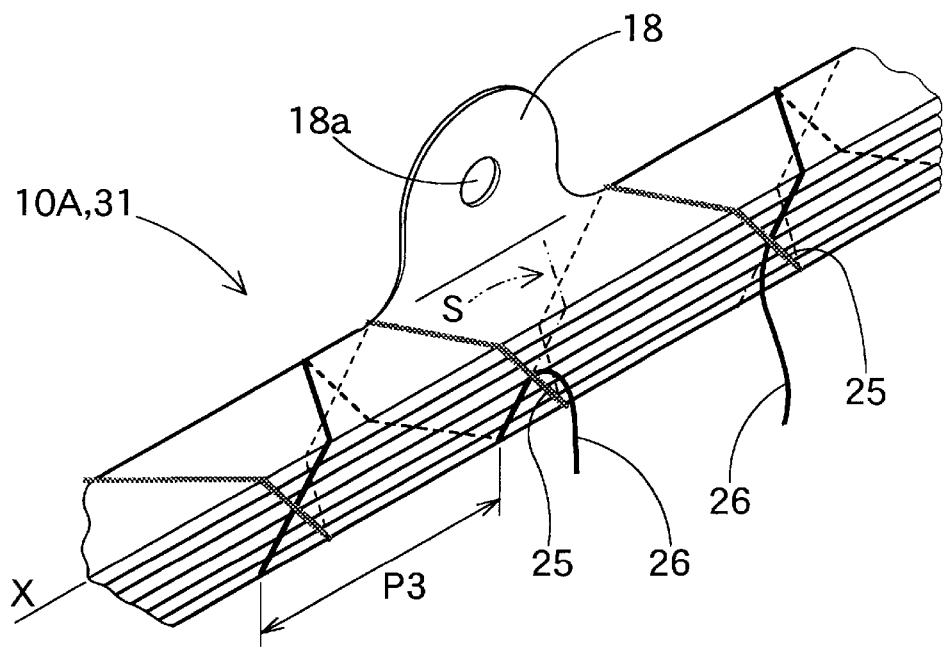
FIG. 12 is a perspective view of a portion of an airbag according to another embodiment.

Here, the construction may be modified into an airbag 10A, as shown in FIG. 12. In this airbag 10A, the pitch P3 of the wrapping members 25 and 26 is narrowed so that the wrapping members 25 and 26 surround the mounting portions 18. Here, the wrapping member 25 or the wrapping member 26 at the position interfering with the mounting portion 18 is partially cut off, and the mounting bracket 38, 41 or 44 is mounted on the mounting portion 18. In this case, the wrapping members 25 and 26 are braided so that the cut wrapping member 25 or 26 is held at the intersections adjacent to the cut portion S by the other wrapping member 26 or 25 left uncut. Therefore, the wrapping member 25 or 26 is prevented from unwrapping at the vicinity of the mounting portion 18.

In the embodiment, moreover, the wrapping members 25 and 26 are adhered at the intersecting portions by applying the adhesive 28 thereto. Even if both the wrapping members 25 and 26 are cut, therefore, their unraveling is limited within the intersections adjoining the cut portions. Therefore, it is possible to shorten the unraveled portion of the wrapping members 25 and 26. Especially with this construction, the wrapping members 25 and 26 need not be jointed at their end portions to the airbag body 11 separately at the front and rear ends of the completely wrapped airbag 31 with a special operation. In other words, the wrapping members 25 and 26 are not loosened at their ends, so that binding operations are simplified.

Figure 13:
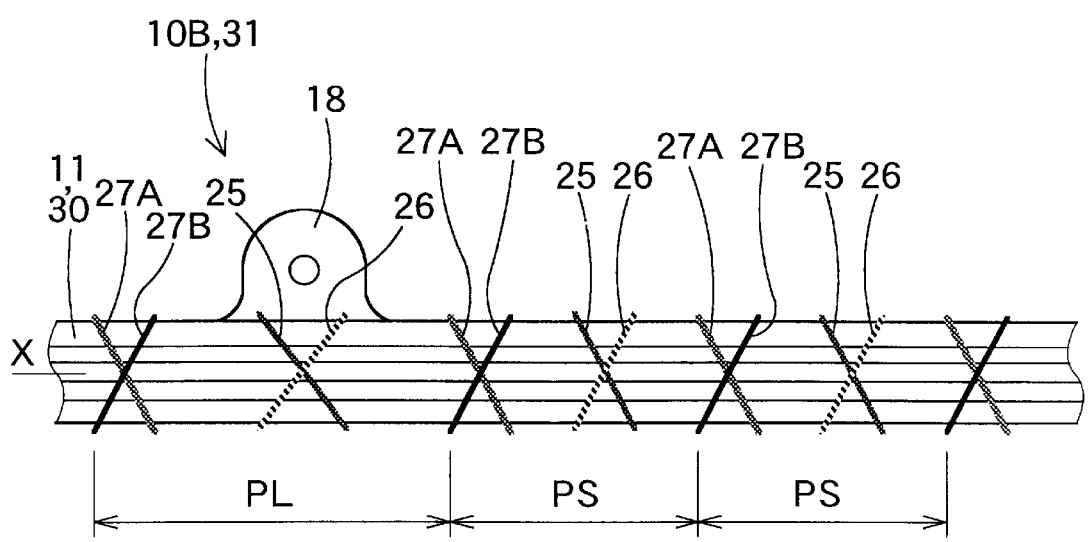
FIG. 13 is a front view of a portion of still another embodiment.

Further, the construction may also be modified into an airbag 10B, on which a plurality of (or four in this embodiment) wrapping members 25, 26, 27A and 27B are wrapped, as shown in FIG. 13. These wrapping members 25, 26, 27A and 27B are not braided in the airbag 10B. In other words, the wrapping members 25, 26, 27A and 27B at the individual intersecting portions are not alternately positioned over the outer periphery of the airbag body 11. In this airbag 10B, the individual wrapping members 25, 26, 27A and 27B are spirally wrapped. In this spiral wrapping, the individual wrapping members 25, 26, 27A and 27B intersect but are always in the same predetermined order on the outer periphery of the airbag body 11. In this spiral wrapping case, too, the wrapping members 25, 26, 27A and 27B are jointed at the intersecting portions by the adhesive 28. Therefore, the terminal treatments are facilitated at the two ends across the completely wrapped airbag 31.

Of course, the intersecting portions need not be formed if the adhesive 28 can be applied to the outer surface itself of the airbag body 11. If the adhesive 28 to adhere to the airbag body 11 is applied to the wrapping members 25, 26, 27A and 27B, more specifically, these wrapping members 25, 26, 27A and 27B may be wrapped on the outer periphery of the completely folded body 30 without any of intersections. In this case, the wrapping members need not be plural and it is good at use of one wrapping member. The embodiment can be handled in the following manner when the wrapping members 25 and 26 are adhered to the airbag body 11. Specifically, the heat-resisting coating agent is not applied to the portions which are exposed to the folded outer periphery of the airbag body 11 and where there is no danger of leakage of the inflating gas, such as the portions of the non-inlet portion 17 on the side of the upper edge 11a of the airbag body 11. Then the wrapping members 25 and 26 may be adhered to the portions of the airbag body 11, to which the heat-resisting coating agent is not applied.

Figure 14:
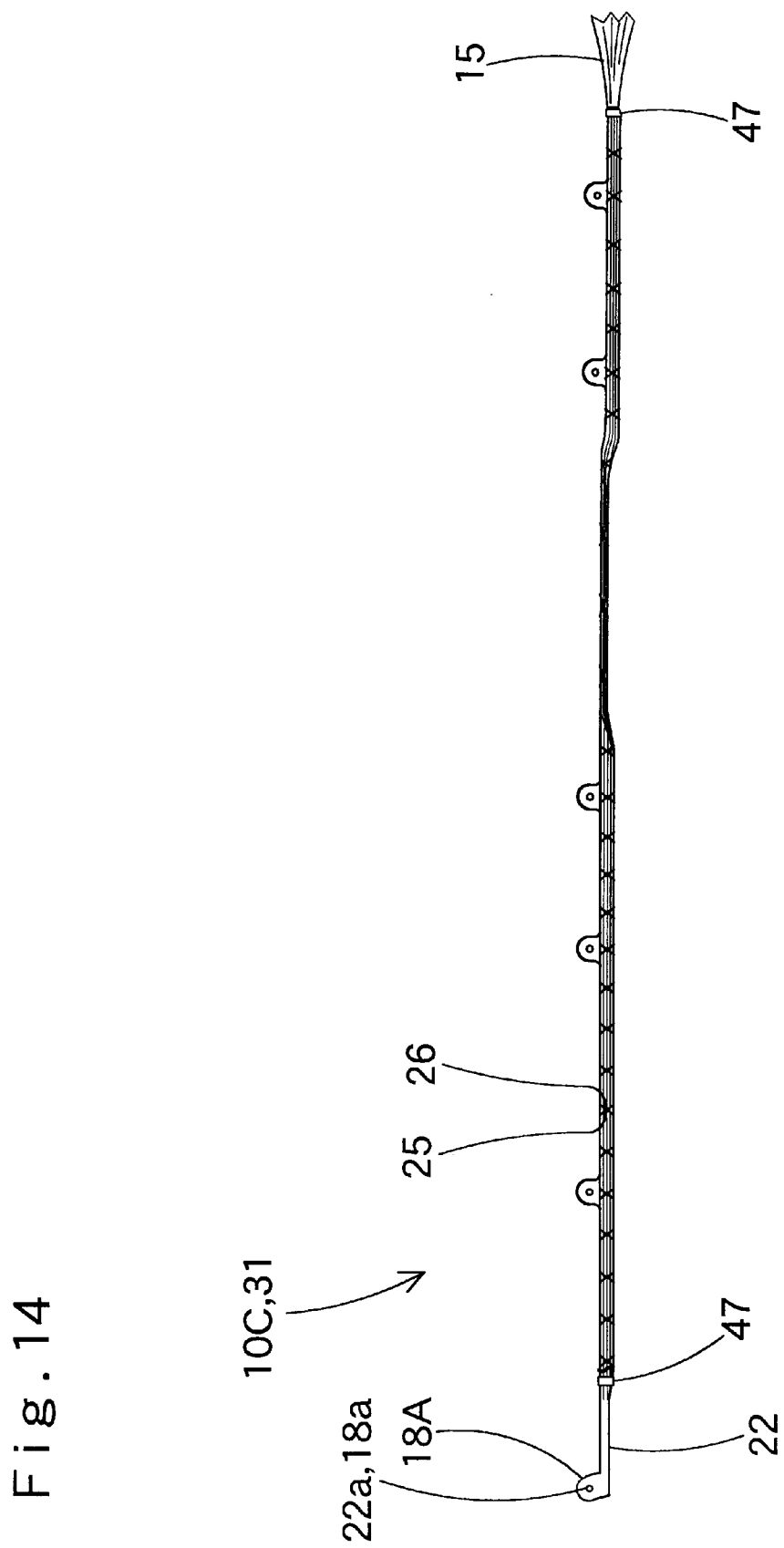
FIG. 14 is a front view of a portion of still another embodiment.

Moreover, the construction may also be modified into an airbag 10C, as shown in FIG. 14, even if the adhesive 28 is not applied to the wrapping members 25 and 26. In this airbag 10C, the tape members 47, which are made to tear when the airbag body 11 is extended/inflated, are wound on the terminal portions of the wrapping members 25 and 26. Moreover, the tape members 47 hold the terminal portions of the wrapping members 25 and 26 on the airbag body 11.

In the airbag 10 of the embodiment, still further, the wrapping device 54 such as a braiding machine is used when the wrapping members 25 and 26 are helically wrapped on the folded airbag body 11 (or the completely folded body 30). In this device 54, the bobbins 56 are revolved around the through hole 58 while spooling off the wrapping members 25 and 26. Moreover, the airbag bodies 30 in the completely wrapped state sequentially continue to move in their axial direction X, being joined by the joint portions 21 and 22 and the joint pins 23. Thus the individual airbag bodies 30 are sequentially inserted into the through hole 58 so that their outer peripheries are helically wrapped with the wrapping members 25 and 26. At this time, the individual wrapping members 25 and 26 can wrap the individual continuing airbag bodies 30 without being cut during the wrapping action. In the second or succeeding airbag bodies 30 connected to the leading body 30, therefore, the wrapping members 25 and 26 need be neither cut nor newly jointed at their terminals to the airbag bodies 30 to be wrapped therewith. In short, the airbag bodies 30 are sequentially wrapped with the wrapping members 25 and 26 if the succeeding airbag bodies 30 are continuously inserted after the leading airbag body 30 into the through hole 58. It is, therefore, possible to perform the wrapping work much more efficiently. Here, the wrapping work could reduce the working step numbers to about one tenth that of the wrapping work of the prior art for winding the tape members intermittently.

Figure 15:
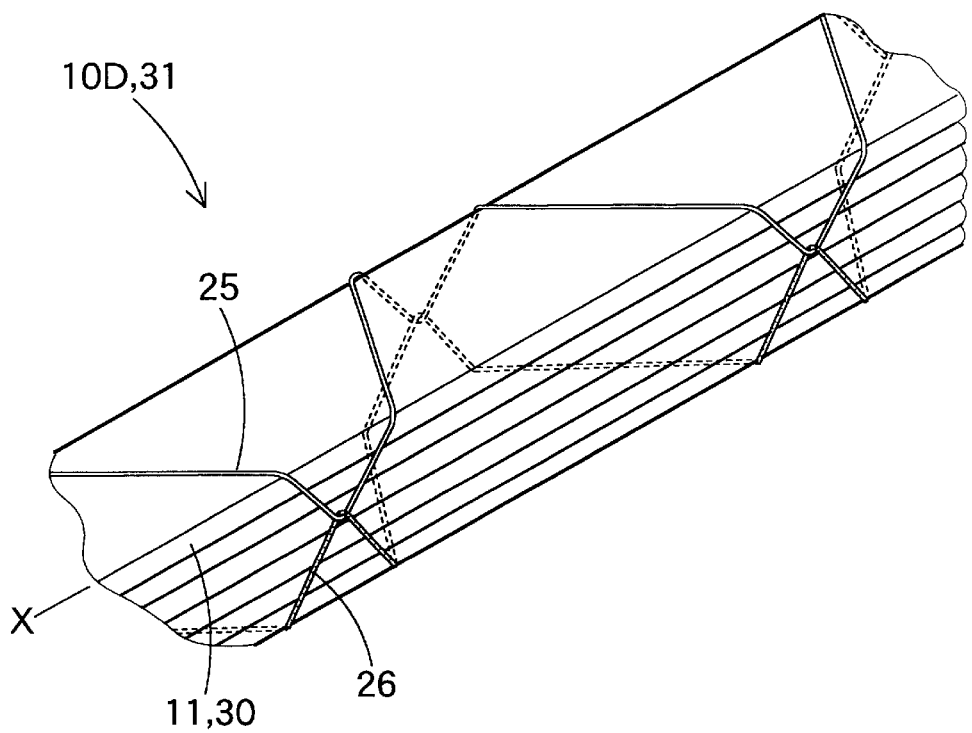
FIG. 15 is a perspective view of a portion of an airbag according to still another embodiment.
Figure 16:
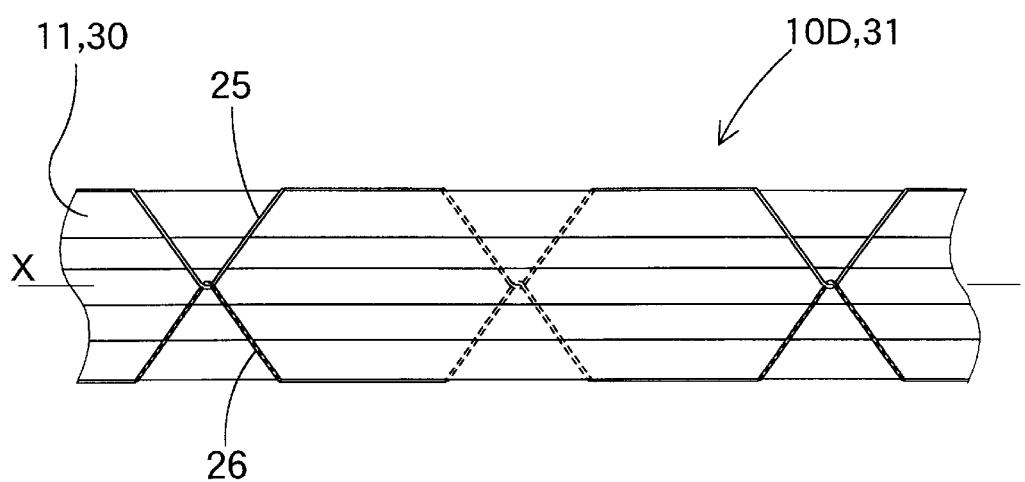
FIG. 16 is a front view of a portion of the airbag shown in FIG. 15.

Here, the airbag 10 of the embodiment has been explained in the case in which the wrapping members 25 and 26 are helically wrapped around the axial direction X of the folded body 30. However, the construction may also be modified into an airbag 10D, as shown in FIGS. 15 and 16, where the wrapping members 25 and 26 are wrapped on the folded, rod-shaped body 11 (or the completely folded body 30) as to intersect the axial direction X thereof obliquely and are wrapped on the outer periphery of the folded body 30 substantially all along the length.

In this airbag 10D, the wrapping members 25 and 26 wrap the folded body 30 such that they wrap the upper side and lower side of the folded body 30 in zigzag-chain stitches. This wrapping can be easily effected by using an industrial sewing machine.

Figure 17:
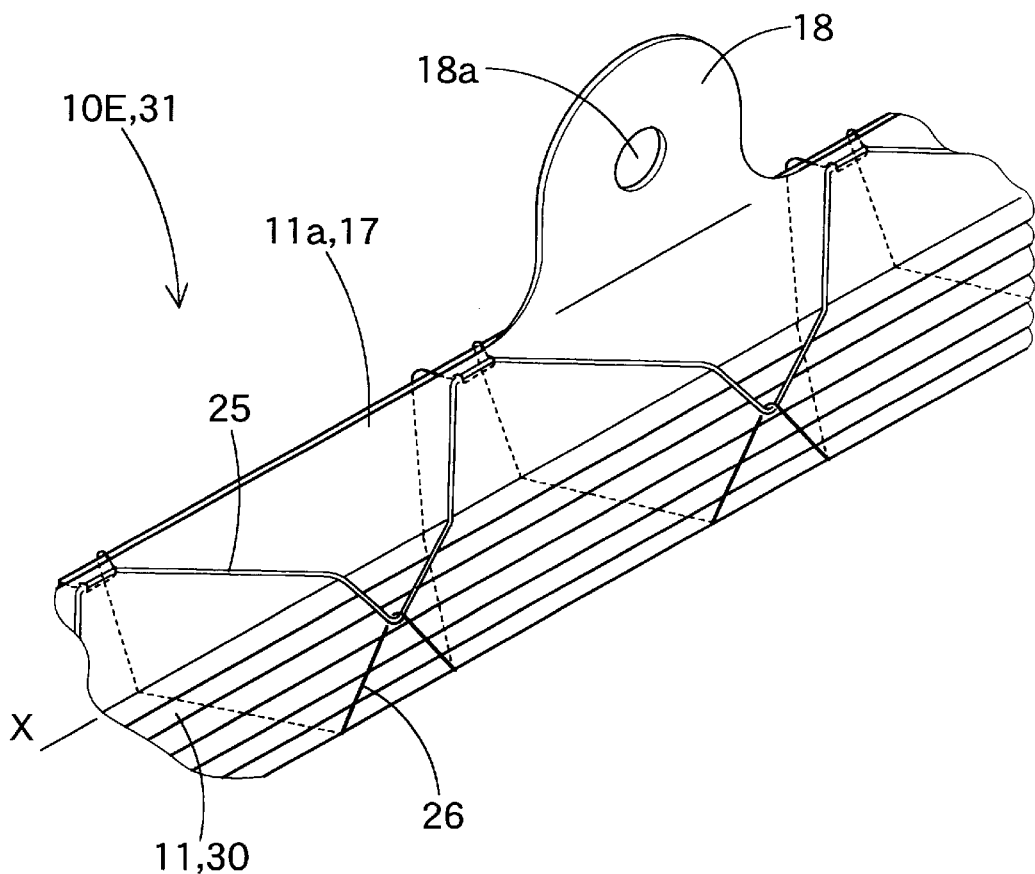
FIG. 17 is a perspective view of a portion of an airbag according to still another embodiment.
Figure 18:
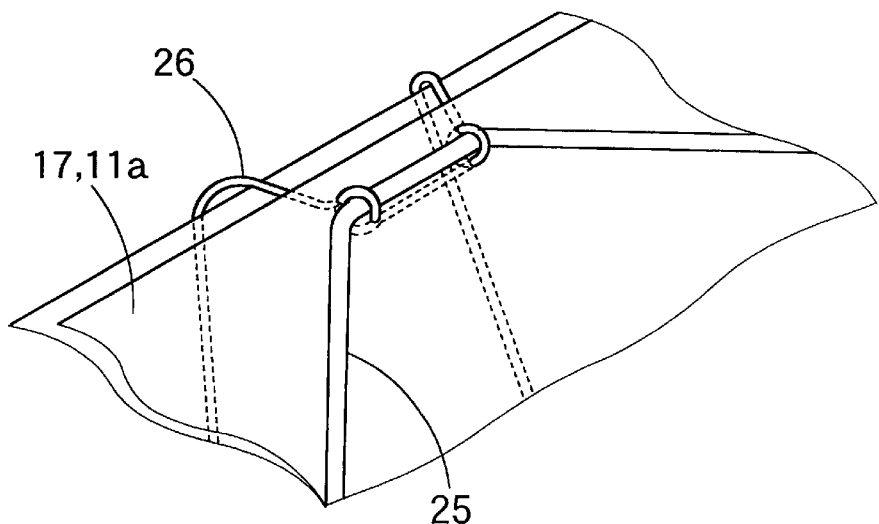
FIG. 18 is an enlarged perspective view showing a stitched portion of a wrapping member of the airbag shown in FIG. 17.
Figure 19:
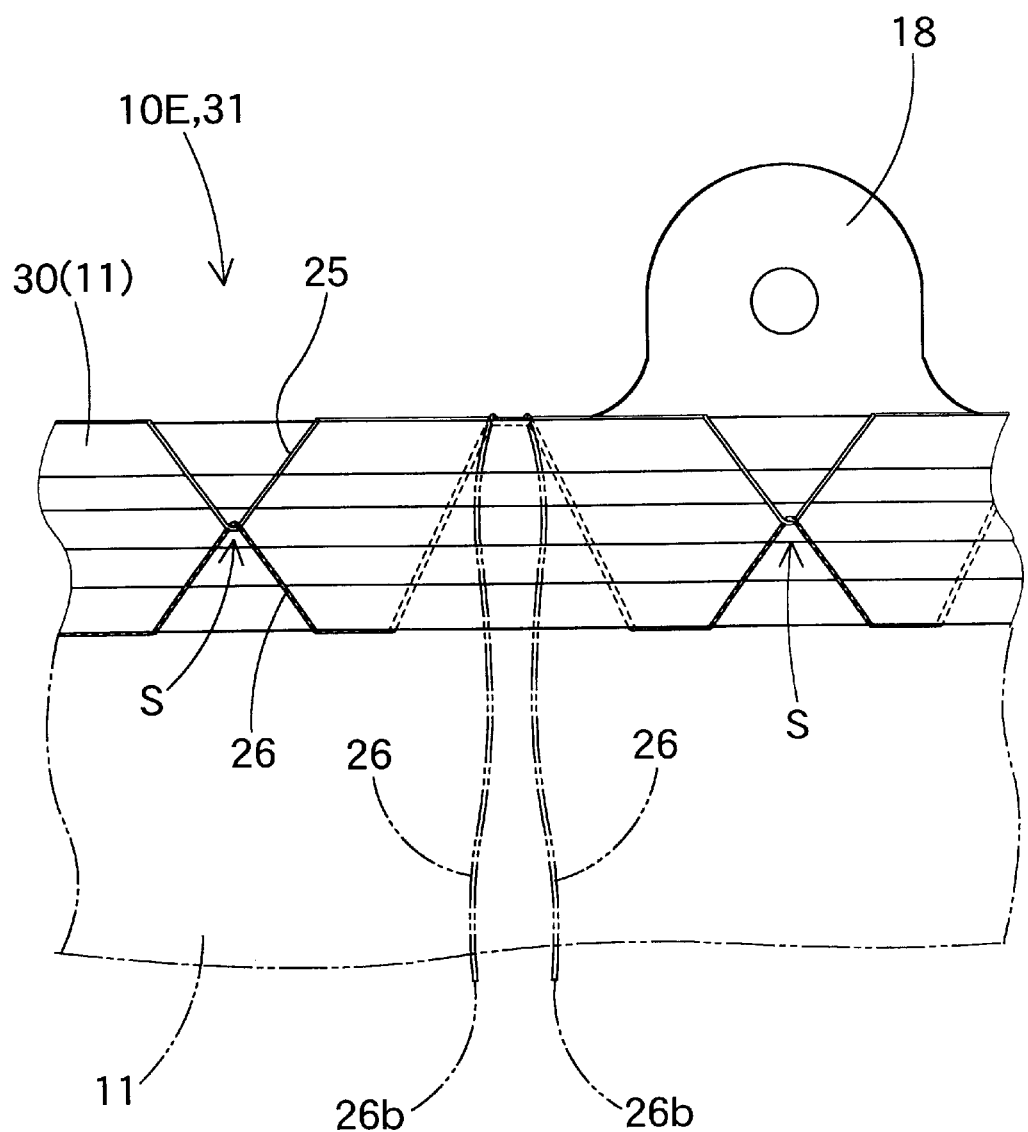
FIG. 19 is a front view showing a portion at the acting time of the airbag shown in FIG. 17.

As in an airbag 10E shown in FIGS. 17 to 19, still further, the wrapping members 25 and 26 may also be stitched to the airbag body 11.

In this airbag 10E, the wrapping member 25 is given a higher tensile strength than that of the wrapping member 26. The wrapping member 25 is arranged on the upper side of the folded body 30. The wrapping member 26 is arranged on the lower side of the folded body 30. Moreover, when the wrapping members 25 and 26 are zigzag-chain linked such that they wrap the folded body 30, they are stitched to the airbag at those positions which when the airbag is inflated are not exposed to the inner side of the car, e.g., the positions of the non-inlet portion 17 on the side of the upper edge 11A of the airbag body 11. Here in the case of the embodiment, the wrapping member 26 is stitched directly to the non-inlet portion 17 on the side of the upper edge 11A of the airbag body 11. When the wrapping member 26 is stitched to the non-inlet portion 17, moreover, the wrapping member 25 is retained by the wrapping member 26 and is stitched indirectly to the non-inlet portion 17. Moreover, the wrapping member 26 of a lower tensile strength wraps the lower side of the folded body 30 between the stitched portions and is wound by the wrapping member 25 of a higher tensile strength.

In this airbag body 10E, the wrapping member 26 on the lower side of the folded body 30 is ruptured at the portions S, at which it is wrapped by the wrapping member 25, as shown in FIG. 19, when the airbag body 11 mounted on the vehicle is inflated. However, the wrapping member 26 is jointed at the stitched portions to the upper edge side 11a of the airbag body 11. Therefore, the wrapping member 26 can be prevented from scattering into the compartment of the vehicle. Of course, these stitched portions are located at the positions which are not exposed to the inner side of the car at the time when the airbag body 11 is inflated. Therefore, the wrapping member 26 and ends 26b of the member 26 can be prevented as much as possible from contacting with the passenger.

Here, the embodiment has been exemplified by the construction in which the wrapping members 25 and 26 are prepared by collecting a plurality of threads. However, the wrapping members 25 and 26 may be individually made of one thread or a flexible band- or string-shaped member.

Moreover, not a plurality but only one wrapping member may be used and helically wrapped. In this case, the folded airbag body 11 (or the completely folded body 30) can possibly be twisted during the wrapping. Therefore, the guides 59 and 60 of the wrapping device 54 are shaped to have their inner circumferential shapes extremely similar to the outer shape of the folded body 30. Thus, this folded body 30 can be expected not to twist.

In the airbag 10 of the embodiment, on the other hand, the pitches P1 and P2, at which the wrapping members 25 and 26 are helically wrapped, are changed. The pitch P2 is enlarged at the portions where the folded portions are thin and where the spring-back hardly ever occurs. On the other hand, the pitch P1 is reduced at the portions where the folded portions are thick and where the spring-back easily occurs. It is, therefore, possible to use the wrapping members 25 and 26 economically. Where the pitch at which the wrapping members are wrapped is to be changed, therefore, the construction may be modified as in the airbag 10B, shown in FIG. 13. At the portions of the mounting portions 18 at which the airbag body 11 is to be mounted on the car body, more specifically, the pitch PL for the wrapping members 25, 26, 27A and 27B is made larger than the pitch PS of the remaining portions. Moreover, the wrapping members 25, 26, 27A and 27B are wrapped around the completely folded body 30 so that they may not interfere with the mounting portions 18. Thus, the wrapping members for wrapping the airbag body may be suitably changed in their wrapping pitches at predetermined positions. Where the wrapping device 54 of the embodiment is used to perform the wrapping work, the pitches can be adjusted extremely easily, if the driving velocity of the transfer means 61 is adjusted to change the transfer velocity (or the passing velocity in the through hole 58) of the completely folded body 30.

What is claimed is:

1. An airbag comprising:
    an airbag body,
    wherein said airbag body is folded for being housed on a peripheral edge of an opening on an inner portion of a car body, the airbag body being folded up into a rod-like shape and being inflatable upon inflow of inflating gas for covering said opening; and a wrapping member made tearable for preventing said airbag body from unfolding prior to inflation, the folded airbag body being wrapped with said wrapping member around an outer periphery of the folded airbag body, wherein said wrapping member is made of a flexible long member and wrapped around the outer periphery of said folded airbag body substantially all along a length of the folded airbag body, so that the wrapping member may extend along the axial direction of said airbag body folded up into the rod-like shape obliquely to said axial direction, wherein said wrapping member includes a plurality of wrapping members wrapped around the outer periphery of said folded airbag body so as to overlap with each other at intersections of the plurality members, the plurality of wrapping members being wrapped around the air bag body from opposite directions to create the intersections.

2. An airbag according to claim 1, wherein said plurality of wrapping members are wrapped around the outer periphery of said folded airbag body such that each of the plurality of wrapping members alternately is located at an uppermost wrapping member position at adjoining ones of the intersections of the plurality of wrapping members.

3. An airbag according to claim 1, wherein said airbag body includes a plurality of mounting portions arranged along the axial direction of said folded airbag body, for mounting said airbag body on said car body, and wherein said wrapping member is wrapped on the outer periphery of said folded airbag body at positions away from said mounting portions.

4. An airbag according to claim 1, further comprising:

an adhesive applied to said wrapping member.

5. An airbag according to claim 4, wherein said plurality of wrapping members intersect with each other, and wherein the adhesive is applied individually to each of said plurality of wrapping members and adheres said plurality of wrapping members at the intersections of the plurality of wrapping members.

6. An airbag according to claim 1, further comprising:

a tearable tape member wound on said folded airbag body for fixing ends of said wrapping members on said airbag body.

7. An airbag according to claim 1, wherein said wrapping member is stitched at positions where the wrapping member is not exposed to the inner portion of the car body when said airbag body is inflated.

8. An airbag according to claim 1, wherein the pitch at which said wrapping member is wrapped on said airbag body varies along the axial direction of said folded airbag body.

9. An airbag according to claim 1, wherein the pitch of said wrapping member around thinner portions of said folded airbag body is set larger than the pitch of said wrapping member around thicker portions of said folded airbag body.

10. An airbag according to claim 1, wherein the outer periphery around the axis of the folded airbag body is restrained at a plurality of separated places corresponding to the plurality of wrapping members.

11. An airbag according to claim 1, further comprising a plurality of mounting portions for mounting the folded airbag body on the inner portion of the car body, wherein a pitch of the plurality of wrapping members is set so that the folded airbag body is wrapped by the plurality of wrapping members absent interference by the plurality of mounting portions.

* * * * *